(12) United States Patent
Prakash et al.

(10) Patent No.: US 7,822,758 B1
(45) Date of Patent: Oct. 26, 2010

(54) METHOD AND APPARATUS FOR RESTORING A DATA SET

(75) Inventors: Ashish Prakash, Morrisville, NC (US); David B. Bolen, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 466 days.

(21) Appl. No.: 11/112,179

(22) Filed: Apr. 22, 2005

(51) Int. Cl.
*G06F 17/30* (2006.01)

(52) U.S. Cl. .................. 707/758; 707/698; 707/812; 714/6

(58) Field of Classification Search .................. 707/758, 707/698, 812; 714/6
See application file for complete search history.

(56) References Cited

U.S. PATENT DOCUMENTS

| | | | | |
|---|---|---|---|---|
| 5,873,101 | A * | 2/1999 | Klein | 707/204 |
| 6,185,699 | B1 * | 2/2001 | Haderle et al. | 714/19 |
| 6,397,351 | B1 * | 5/2002 | Miller et al. | 714/13 |
| 6,487,561 | B1 * | 11/2002 | Ofek et al. | 707/204 |
| 6,732,123 | B1 * | 5/2004 | Moore et al. | 707/202 |
| 2004/0030951 | A1 * | 2/2004 | Armangau | 714/6 |

OTHER PUBLICATIONS

Levy et al, Incremental Recovery in Main Memory Database Systems, Mar. 5, 1992, IEEE, pp. 529-540.*
Toby Creek, "Applications for Writeable LUNs and LUN Cloning in Oracle Environments", Technical Report, Jun. 2003, pp. 1-10, Network Appliance, Inc., Sunnyvale, CA.
"Network Appliance, SnapRestore Software", 2002, pp. 1-2, Network Appliance, Inc., Sunnyvale, CA.

* cited by examiner

*Primary Examiner*—Neveen Abel Jalil
*Assistant Examiner*—Sherief Badawi
(74) *Attorney, Agent, or Firm*—Blakely, Sokoloff, Taylor & Zafman LLP

(57) ABSTRACT

A method of operating a storage server includes executing a process of restoring a data set in an active file system of the storage server from a persistent point-in-time image of a data set, and during the process of restoring the data set, servicing input/output requests directed at the data set by a client of the storage server.

18 Claims, 13 Drawing Sheets

| LUN ID | Active File Handle | | Backing File Handle | | Type |
|---|---|---|---|---|---|
| | Inode # | PPI ID | Inode # | PPI ID | |

FIG. 7

METHOD AND APPARATUS FOR RESTORING A DATA SET

FIELD OF THE INVENTION

At least one embodiment of the present invention pertains to data storage systems, and more particularly, to a method and apparatus for restoring a data set.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Enterprise-level filers are made by Network Appliance, Inc. of Sunnyvale, Calif. (NetApp®).

In a SAN context, the storage server provides clients with block-level access to stored data, rather than file-level access. Some storage servers are capable of providing clients with both file-level access and block-level access, such as certain Filers made by NetApp.

Filers made by NetApp have the ability to generate a Snapshot™ of stored data. A Snapshot is a persistent, read-only, point-in-time image of data set, such as a volume, file, or logical unit number (LUN). A Snapshot captures the exact state of data in a data set at the point in time that the Snapshot was taken. This allows the state of the data set to be restored from the Snapshot in the event of, for example, a catastrophic failure of the storage system or corruption of data. The ability to restore data from a Snapshot provides administrators with a simple mechanism to revert the state of their data to a known previous state in time as captured by the Snapshot. Creation of a Snapshot or restoring from a Snapshot can be controlled from a client-side software tool, such as SnapDrive™ or SnapManager® for Microsoft® Exchange, both made by NetApp.

Desirable features to have, when restoring data from a Snapshot, include speed, space efficiency, and the ability to restore data at a fine level of granularity. An existing technique for restoring from a Snapshot is known as volume SnapRestore® from NetApp. Volume SnapRestore allows an entire volume to be restored from a Snapshot relatively quickly and in a predictable amount of time. However, often a user would like to restore less than an entire volume from a Snapshot, such as a single file or LUN, which cannot be done with volume SnapRestore.

Another existing restore technique from NetApp, known as single-file SnapRestore (SFSR), allows a single file or LUN to be restored from Snapshot. However, SFSR takes a non-deterministic amount of time to complete, depending on the size and layout of the file or LUN. This uncertainty can cause users anxiety or irritation. This issue is exacerbated by the fact that, with either volume SnapRestore or SFSR, a storage client cannot perform any input/output (I/O) operations (i.e., reads or writes) on the data set that is being restored until the restore process is complete. Depending on the size and layout of the data set, the result may be anywhere from a few minutes to an hour or more during which data cannot be served to the client. This amount downtime may be unacceptable for applications that are sensitive to downtime and need to be quiesced during backup and restore operations, such as databases and file systems.

Storage space consumption is also an issue when restoring from a Snapshot. Existing restore techniques require at least as much free storage space to be available for the restore as consumed by the Snapshot. For example, if a Snapshot is 100 GB, known restore techniques could result in an additional 100 GB being consumed in the active file system. In a system where storage space is at a premium, this amount of storage space consumption may be undesirable.

SUMMARY OF THE INVENTION

The present invention includes a storage server and a method of operating a storage server. The method includes executing a process of restoring a data set in an active file system of the storage server from a persistent point-in-time image (PPI), and during the process of restoring the data set from the PPI, servicing I/O requests directed at the data set by a client of the storage server.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 7 shows an example of a VDisk Table of Contents (VTOC);

DETAILED DESCRIPTION

A method and apparatus for restoring a data set from a read-only, persistent point-in-time image (PPI) of data set are described. The PPI may be, for example, a Snapshot™ of a volume. The described technique provides an efficient mechanism in a storage server for restoring a data set from a PPI. In one embodiment of the invention, the method includes two phases. The first phase involves creating a "clone" of the data set to be restored (a new data set backed by the PPI) and transparently redirecting I/Os (read or write requests) to the data set once a restore has been started, in order to service requests as quickly as possible after starting the restore. The second phase involves "splitting" the clone from the PPI (i.e., removing any dependencies of the clone on the PPI), and making the split space efficient by sharing common blocks between the data set being restored and the PPI. This process is done in the background, and sufficient state is maintained persistently such that the process can resume on reboots.

To facilitate description, it is henceforth assumed that the data set to be restored from the PPI is a LUN, where any particular volume may include one or more LUNs. It will be recognized, however, that essentially the same technique introduced herein could be used to efficiently restore any other container of data from a PPI, such as a file, a volume, etc.

The described technique provides virtually instant access to data being restored, reducing application downtime. Restores using this technique are efficient in the space they consume. This technique also greatly simplifies restoring and monitoring of the restoring process. The technique provides the ability to serve data to a client while the space efficient reconciliation of blocks occurs in the background transparently to the client. The technique is particularly useful, therefore, for large LUNs and files for applications that are sensitive to downtime and need to be quiesced during backup and restore operations, such as databases and file systems.

Figure 1:
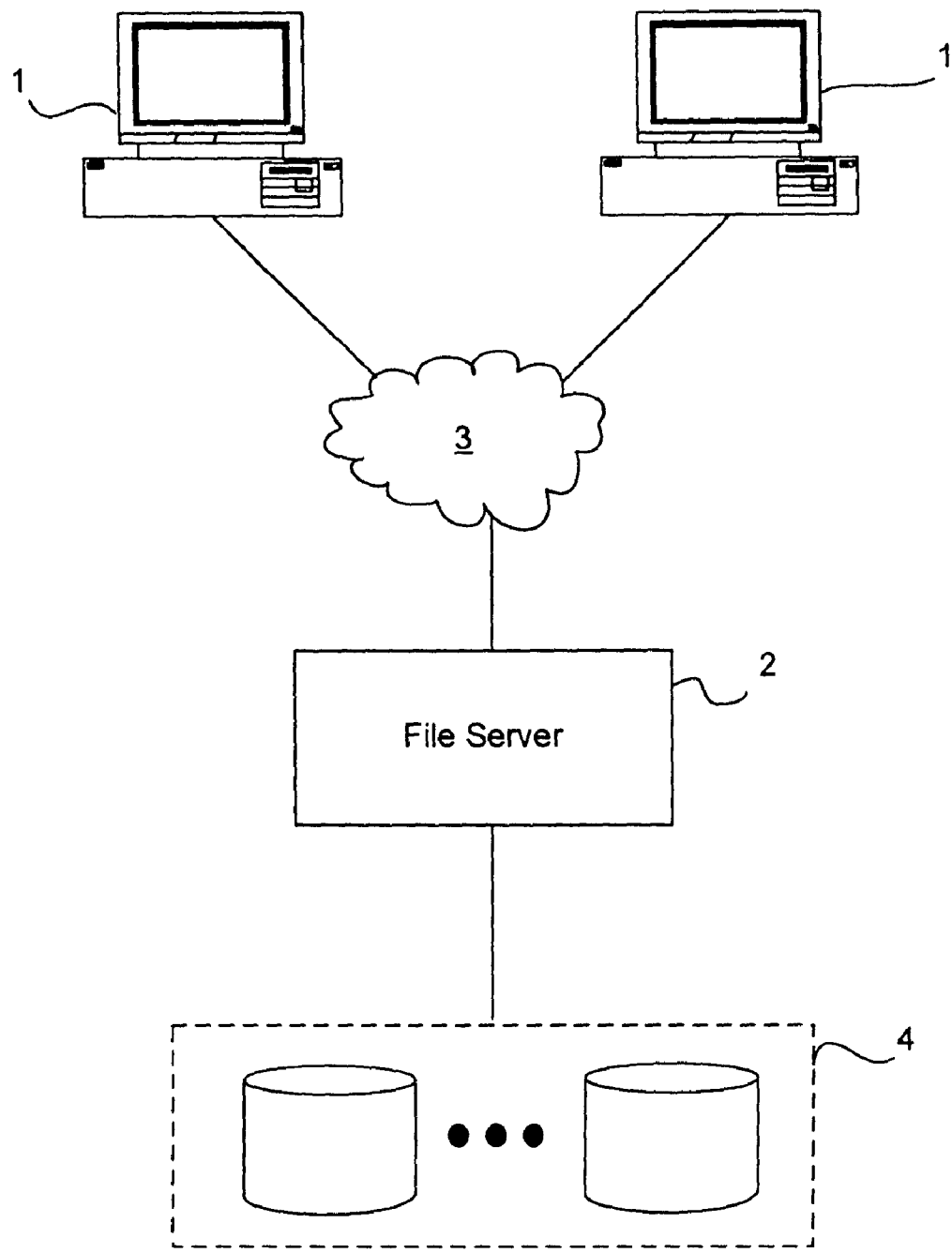
FIG. 1 illustrates a storage network environment.

FIG. 1 shows a network environment in which the invention can be implemented. A storage server 2 is coupled locally to a storage subsystem 4, which includes multiple mass storage devices (e.g., disks). The storage server 2 is also coupled through a network 3 to a number of storage clients 1 (hereinafter simply "clients"). The storage subsystem 4 is managed by the storage server 2. The storage server 2 receives and responds to various read and write requests from the clients 1, relating to LUNs, files, or other units of data stored in (or to be stored in) the storage subsystem 4.

Each of the clients 1 may be, for example, a conventional personal computer (PC), workstation, or the like. The storage server 2 may be, for example, a file server used in a NAS mode (a "filer"), a block-based storage server such as used in a storage area network (SAN), a storage server which can perform both file-level access and block-level access for clients, or another type of storage server. The network 3 may be, for example, a local area network (LAN), a metropolitan area network (MAN), a wide area network (WAN), a global area network (GAN) such as the Internet, or other type of network or combination of networks. The network 3 may implement, for example, Ethernet protocol, Fibre Channel protocol, or another protocol or a combination of protocols.

The storage subsystem 4 may store data represented in an active file system of the storage server 2 as well as one or more PPIs. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 4 can be organized as one or more RAID groups, in which case the storage server 2 accesses the storage subsystem 4 using an appropriate RAID protocol.

Figure 2:
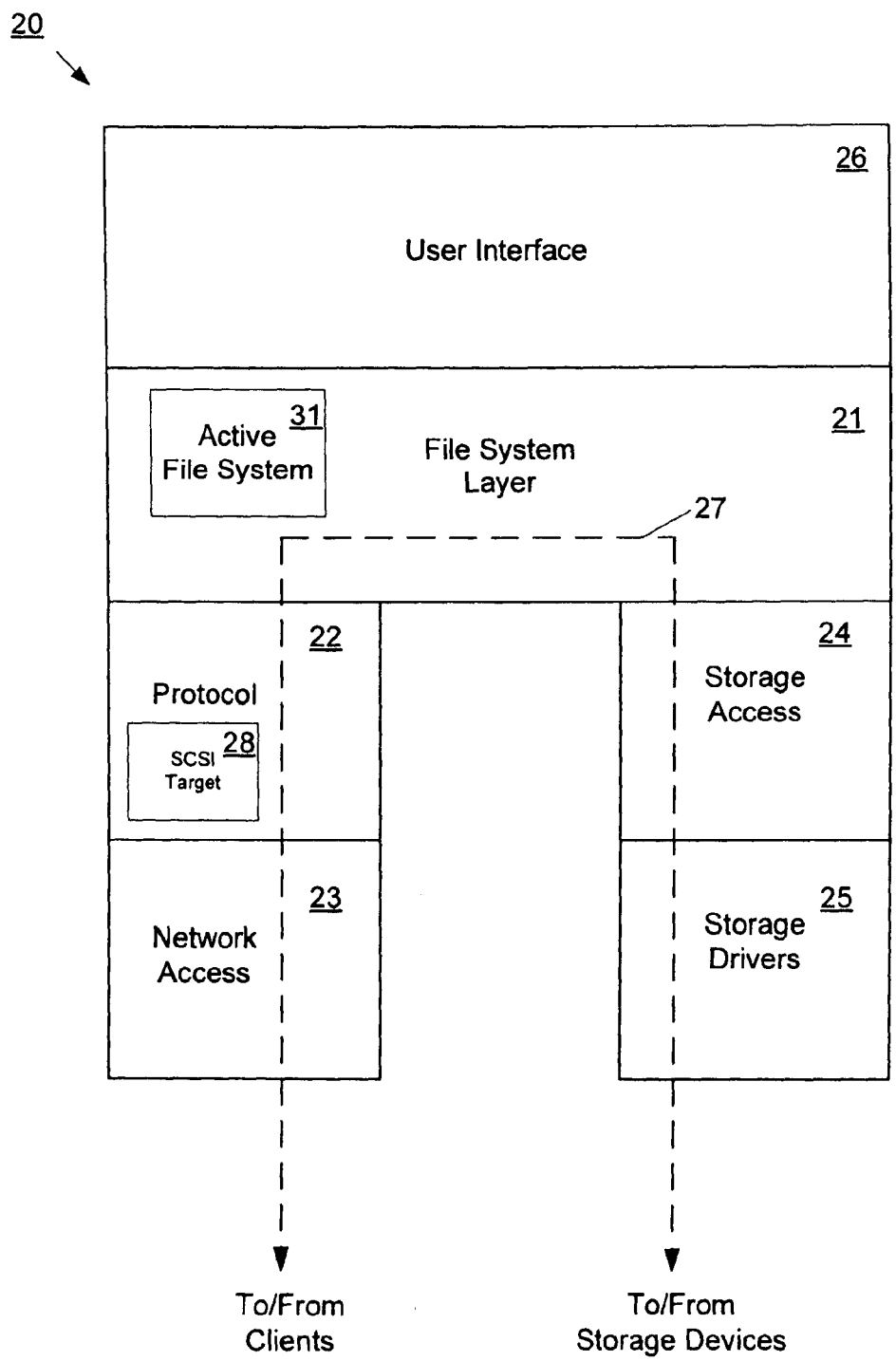
FIG. 2 illustrates an example of an operating system of the storage server in FIG. 1.

FIG. 2 shows an example of the architecture of the operating system of the storage server 2. As shown, the operating system 20 includes several software modules, or "layers". These layers include a file system layer 21. The file system layer 21 is an application-level layer which imposes a structure, e.g. a hierarchy, on files and directories stored by the storage server 2 and which services read/write requests from clients 1. This hierarchy is referred to as the "active file system". Logically "under" the file system layer 21, the operating system 20 also includes a network access layer 22 and an associated media access layer 23, to allow the storage server 2 to communicate over the network 3 (e.g., with clients 1). The network access 22 layer implements various higher-level network protocols, such as Network File System (NFS), Common Internet File System (CIFS), Hypertext Transfer Protocol (HTTP) and/or Transmission Control Protocol/Internet Protocol (TCP/IP). In addition, assuming the storage server 2 is configured to operate in a SAN, the network access layer 22 also includes a SCSI target layer, to enable the storage server 2 to receive and respond to SCSI I/O operations (i.e., read and writes). The media access layer 23 includes one or more drivers which implement one or more lower-level protocols to communicate over the network, such as Ethernet, Fibre Channel or Internet small computer system interface (iSCSI).

Also logically under the file system layer 21, the operating system 20 includes a storage access layer 24 and an associated storage driver layer 25, to allow the storage server 2 to communicate with the storage subsystem 4. The storage access layer 24 implements a higher-level disk storage protocol, such as RAID, while the storage driver layer 25 implements a lower-level storage device access protocol, such as Fibre Channel Protocol (FCP) or small computer system interface (SCSI). Also shown in FIG. 2 is the path 27 of data flow, through the operating system 20, associated with a read or write operation.

The operating system 20 also includes a user interface layer 26 logically on top of the file system layer 21. The user interface layer 26 may provide a command line interface (CLI) and/or a graphical user interface (GUI) to various storage server functions, to allow an administrator to manage the storage server 2.

To facilitate description, it is assumed that the storage server 2 can at any time create a PPI of any data to which it has access (e.g., volumes, LUNs, etc.). It is further assumed for purposes of description that the storage server 2, when writing modified data to disk, does not write the modified data blocks "in place". Rather, whenever a block of data is modified, the block is written to a new physical location on disk; this property is referred to herein as "write anywhere".

Figure 3:
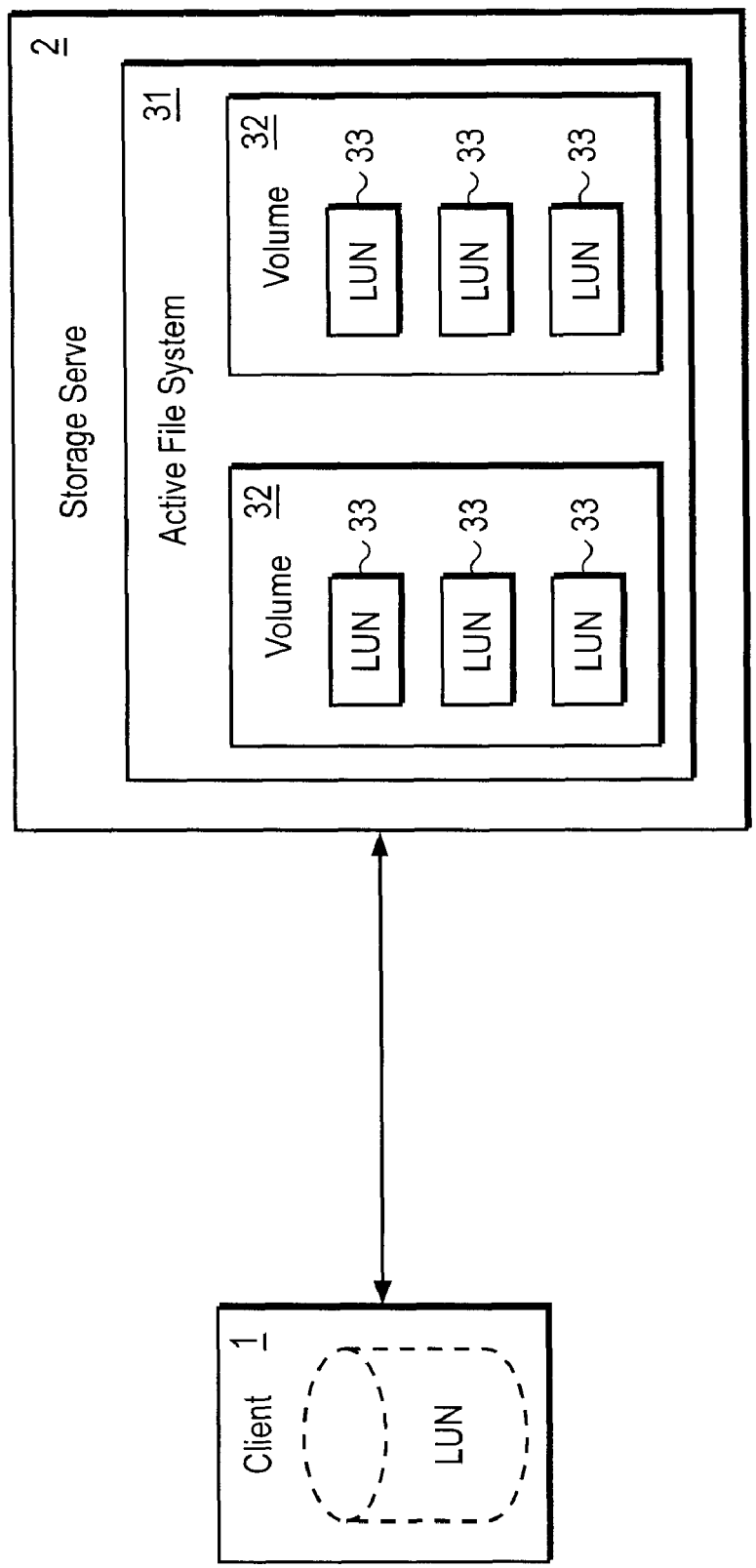
FIG. 3 shows an example of the relationship between LUNs, volumes and the active file system in the storage server.

Referring now to FIG. 3, the storage server 2 has an active file system 31, which is created and managed by the file system layer 21 of the operating system 20. The active file system 31 includes a number of storage volumes 32, each of which includes one or more LUNs 33. It will be recognized that each volume 32 or LUN 33 can contain different data from that in any other volume or LUN, although volumes 32 and LUNs 33 can also be duplicates of each other. Each volume 32 represents a set of one or more physical storage devices, such as disks. A LUN 33 is a data container that is exported to a client 1 and which, from the perspective of a client 1, appears to be a storage device, such as a disk. However, each LUN 33 is actually stored as a file in the active file system 31 and is striped across multiple physical storage devices according to a RAID protocol.

Figure 4:
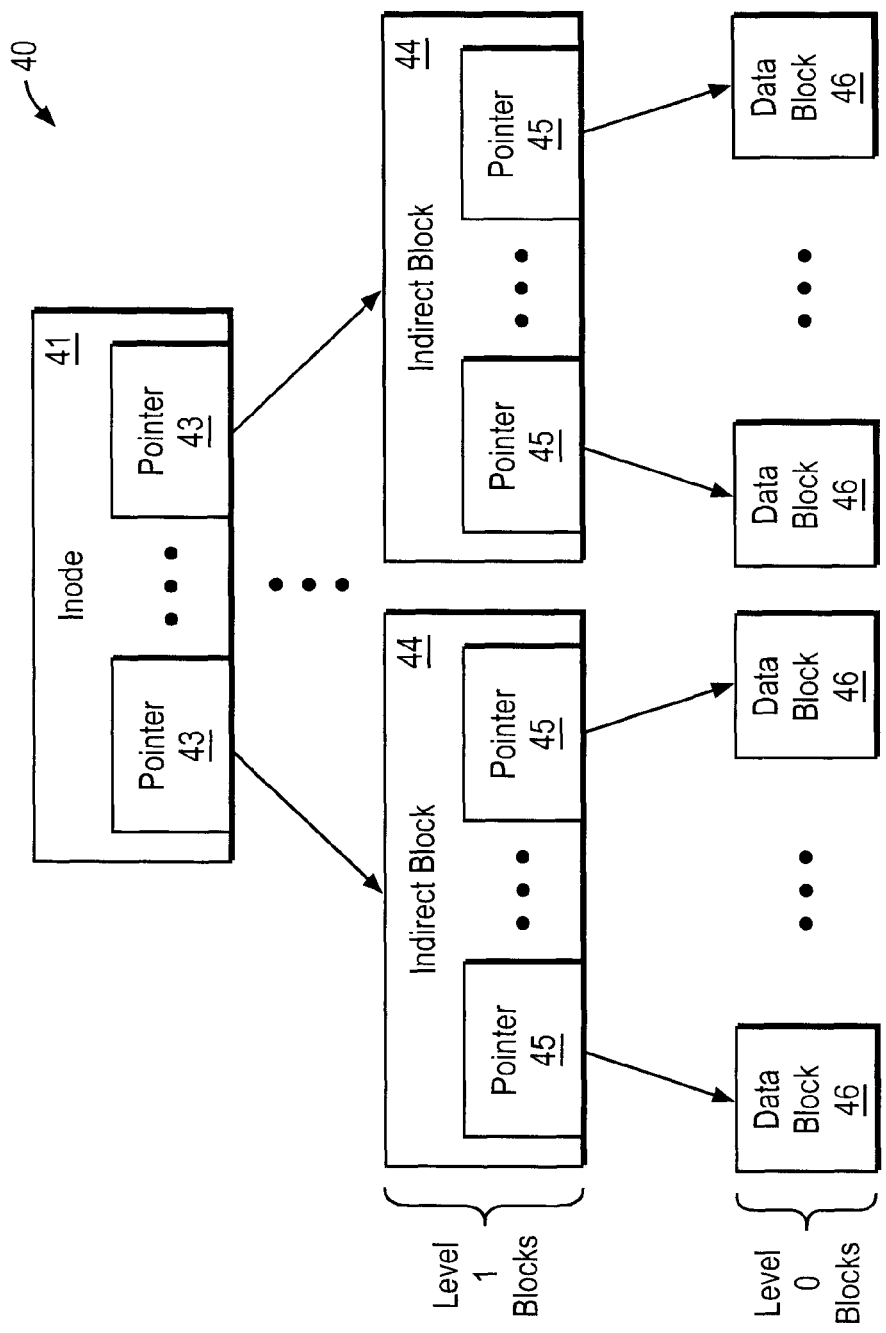
FIG. 4 shows an example of a buffer tree representing a file in the storage server.

In the active file system or in a PPI, each file (and therefore each LUN) is stored in the form of a "buffer tree". A buffer tree is an internal representation of the data blocks for a file. An example of a buffer tree is shown in FIG. 4. Each buffer tree has an inode 41 at its root (top-level). An inode 41 is a data structure used to store information, such as metadata, about the file, whereas the data blocks are structures used to store the actual data for the file. The information contained in an inode 41 may include, for example, ownership of the file, access permission for the file, size of the file, file type and references to locations on disk of the data blocks for the file. Each inode 41 also includes a "clone" flag which indicates whether the file is a clone of another file.

The references to the locations of the file data are provided by pointers 43 in the inode 41, which may point to indirect blocks 44 (also called "Level 1 blocks" or "L1 blocks"). The indirect blocks 44 contain pointers 45 that reference the actual data blocks 46 (also called "Level 0 blocks" or "L0 blocks"), depending upon the quantity of data in the file. Each pointer 43 or 45 may be embodied as a virtual block number (VBN) to facilitate efficiency among the file system and the RAID system when accessing the data on disks.

Note that there may be additional levels of indirect blocks (e.g., level 2, level 3) depending upon the size of the file. That is, the data of the file are contained in direct (L0) blocks 46 and the locations of these blocks are stored in the indirect (L1) blocks 44 of the file. In one embodiment, each indirect block 44 can contain pointers to as many as 1,024 direct blocks. According to the "write anywhere" nature of the file system, these blocks may be located anywhere in the storage subsystem 4. The logical (sequential) position of a direct (L0) block 46 within a file is indicated by the block's file block number (FBN).

The storage access (e.g., RAID) layer 24 of the operating system 20 maintains information about the geometry of the underlying physical disks (e.g., the number of blocks in each disk) in RAID labels stored on the disks. The RAID layer provides the disk geometry information to the file system for use when creating and maintaining the virtual block number (VBN)-to-disk block number (DBN) mappings used to perform write allocation operations and to translate VBNs to disk locations for read operations. Block allocation data structures are used to describe block usage within the active file system 31. These mapping data structures are independent of the storage geometry and are used by a write allocator of the file system layer 21 as existing infrastructure for a logical volume.

Figure 5:
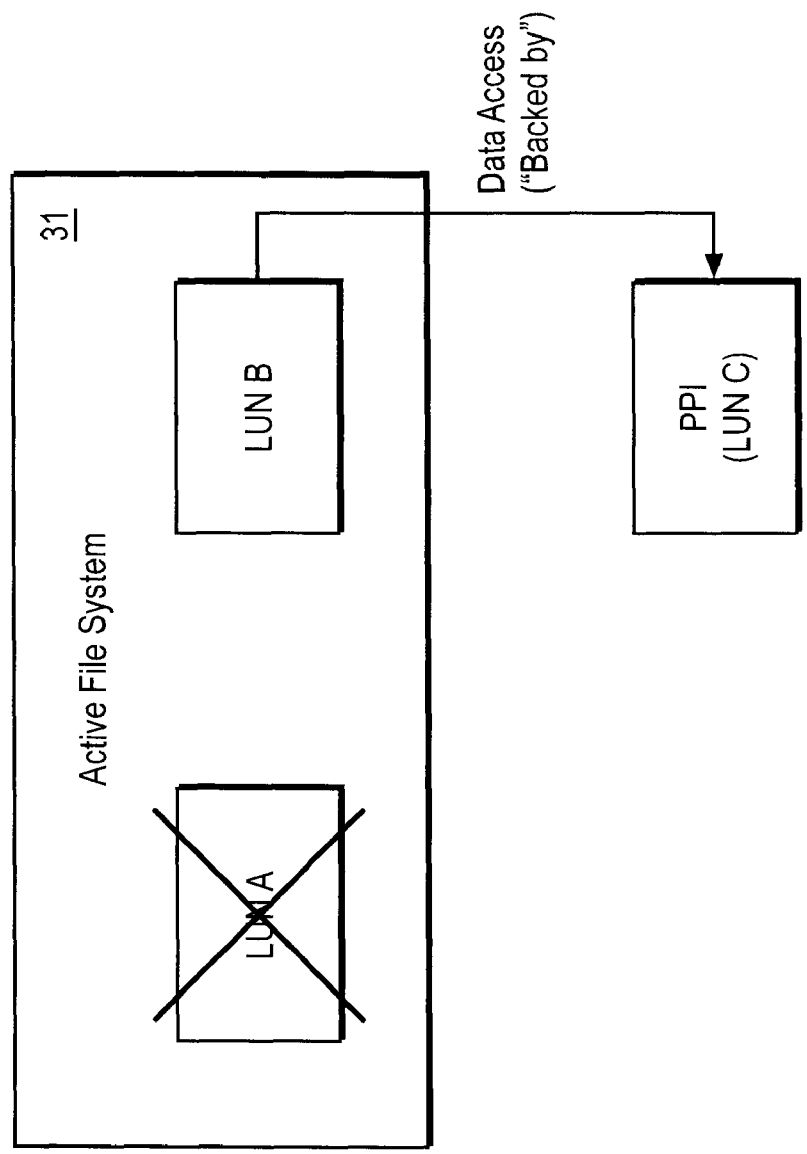
FIG. 5 illustrates the creation of a clone of a persistent point-in-time image (PPI) in the active file system.

Referring now to FIG. 5, assume that a user wishes to restore a LUN in the active file system, call it LUN A, from a stored PPI (LUN C). The restore technique introduced here, according to an embodiment of the invention, has two phases. In the first phase, as described further below, the LUN to be restored (LUN A) is first destroyed in the active file system 31, and a new, empty LUN is created in the active file system 31, call it LUN B, which is "backed by" the PPI. This new LUN (LUN B) is referred to as a "clone" of the PPI. What is meant by "backed by" the PPI is that initially LUN B has no direct (L0) blocks, and the data for LUN B is located by following the buffer tree of the PPI. This involves atomically changing metadata in a table of entries for LUNs so that any I/O directed to LUN B will instead be served from the PPI (LUN C). After destroying LUN A and creating LUN B backed by the PPI, the first phase then further involves atomically changing metadata in the table of entries for LUNs so that any I/O directed to LUN A will instead be served from LUN B.

The second phase, as described further below, involves comparing indirect (L1) blocks in LUN B in the active file system with the corresponding indirect blocks in the PPI. For every direct (L0) block pointer that is a "hole" in LUN B's indirect block but is not a hole in the corresponding indirect block of the PPI, the direct block pointer in LUN B is changed to point to the corresponding direct (L0) block in the PPI. A "hole" is a pointer (to a direct block) which has a value of zero or null, i.e., a pointer to a direct block that does not contain any valid data. Whenever a new LUN is created in the active file system 31, all of its pointers to direct blocks are initially holes. This approach preserves space rather than merely copying the data block out from the PPI.

Figure 6:
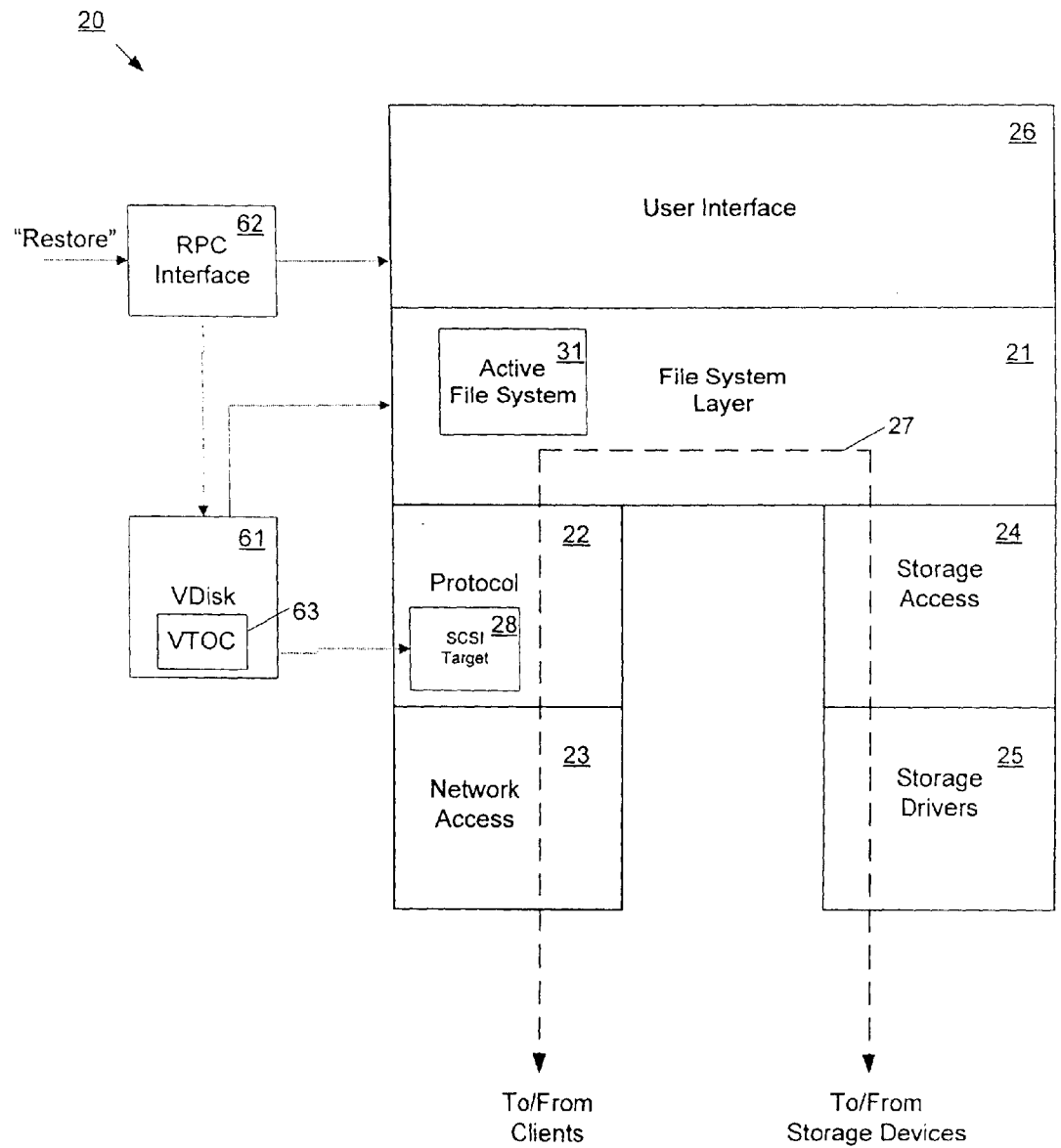
FIG. 6 illustrates an example of an operating system of a storage server according to embodiments of the invention.

FIG. 6 illustrates elements of the storage operating system 20 that may be used to implement this technique. The operating system 20 of FIG. 6 is similar to that of FIG. 2, however, it further includes a virtual disk (VDisk) module 61 and a remote procedure call (RPC) interface 62. The RPC interface 62 is an administrative interface that allows the storage server 2 to receive and respond to commands from a remote application, such as an application designed to manage the creation of PPIs. Hence, the RPC interface 62 initially receives a request to restore a LUN (LUN A) from a PPI (LUN C), and this request is forwarded to the VDisk module 61 for processing.

The VDisk module 61 controls and/or coordinates much of the functionality of the restore technique being introduced here. The VDisk module 61 includes a VDisk table of contents (VTOC) 63, which is a mapping of LUNs to file handles used by the active file system 31. Each volume maintained by the storage server 2 has a separate VTOC 63 within the VDisk module 61, and each VTOC 63 includes a separate entry for each LUN within that volume. The SCSI target layer 28 also maintains its own cached conversion of the VTOC 63.

Any request from a client 1 to read or write a LUN or to restore a LUN will be passed to the SCSI target layer 28 and will include (among other things) a LUN identifier (ID). The SCSI target layer 28 therefore uses its cached version of the VTOC 63 to map the LUN identifier in the request to the file handle of that LUN used by the active file system 31. As noted above, each LUN is stored in the form of a file within a corresponding volume in the active file system 31.

FIG. 7 shows an example of the content of a VTOC 63. The VTOC 63 includes a separate entry for each LUN. Each entry includes a LUN identifier (ID) that uniquely identifies the LUN, an active file handle representing the file handle of that LUN in the active file system 31, a backing file handle representing the file handle of any PPI that may be used to back that LUN (if any), and a LUN type indicating the type of the LUN (e.g., Windows, Solaris, etc.). A file handle (active or backing) includes the inode number of the LUN's inode and a PPI ID identifying the PPI (if any) that contains the LUN.

For purposes of the normal read/write operations, the backing file handles and the PPI ID of any active file handle are generally null. However, these parameters are used when restoring data from a PPI. Any non-null value in the backing file handle indicates that the LUN is a clone of a PPI. In that case, the PPI ID within the backing file handle identifies the PPI which backs the (clone) LUN. A null value in the backing file handle indicates that the LUN is not backed by a LUN in a PPI. A null PPI ID in the active file handle means that the LUN is part of the active file system 31. A non-null PPI ID in the active file handle means that the LUN is part of a snapshot (the snapshot identified by the PPI ID).

Figure 8:
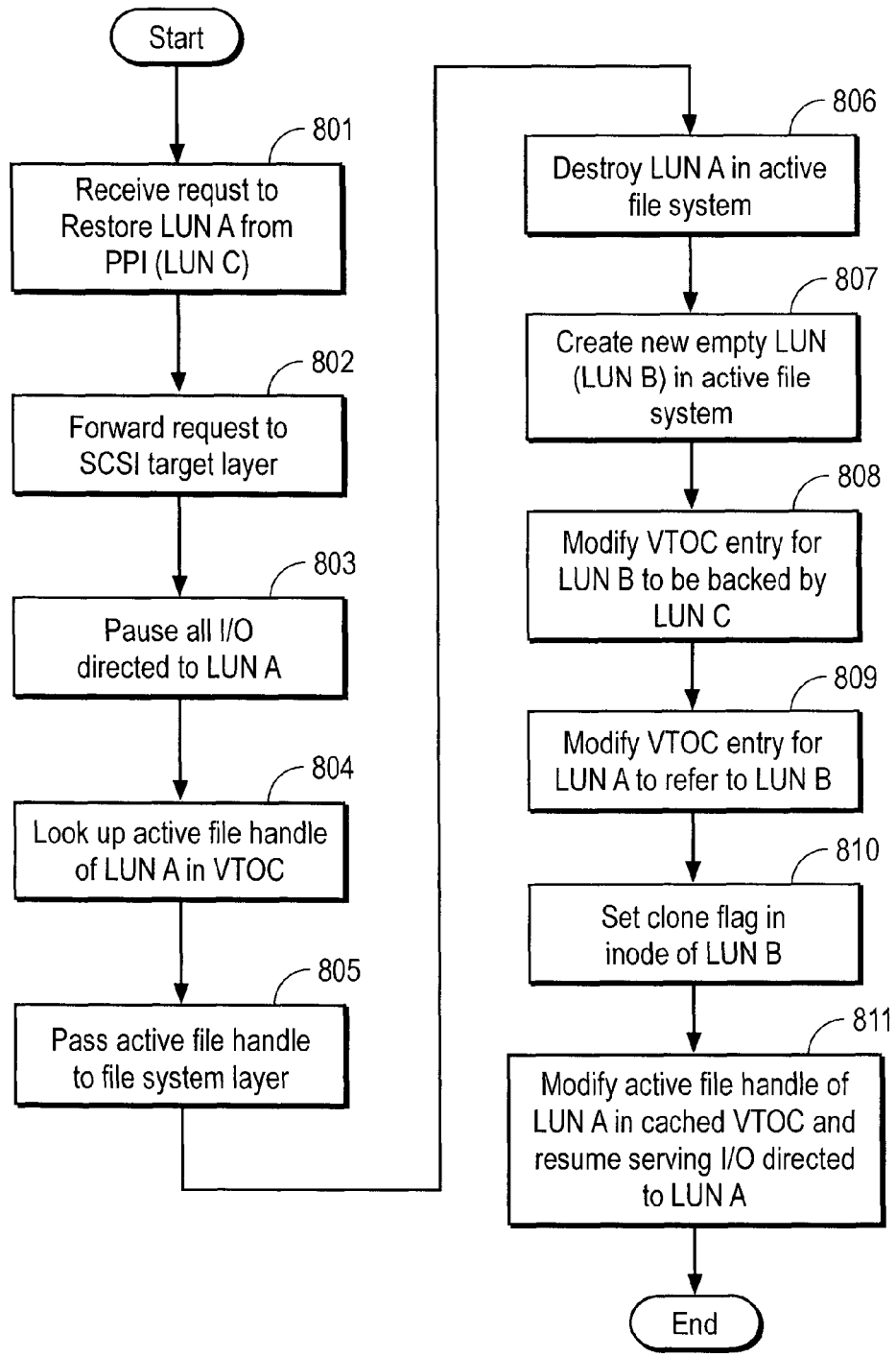
FIG. 8 is a flow diagram illustrating an example of a process of creating a clone of a PPI.

The first phase of the restore process (the LUN cloning phase) will now be further described with reference to FIGS. 7 and 8. A request from a client to restore a specific LUN (LUN A) from a specific PPI (LUN C) is initially received by the RPC interface 62 at 801, and at 802 the request is forwarded via the VDisk module 61 to the SCSI target layer 28.

The Restore request includes the LUN identifier of LUN A and the LUN identifier of LUN C. In response to request, the SCSI target layer 28 immediately pauses all I/O directed to LUN A at 803. Any new read or write request directed to this LUN is temporarily queued in a buffer in the SCSI target layer 28. At 804 the SCSI target layer 28 then uses its cached version of the VTOC 63 to look up the active file handle of LUN A, based on the LUN identifier in the Restore request.

At this point (and just before initiation of the restore process), the active file handle of LUN A might appear in the VTOC as [A,0] (representing [inode number, PPI ID]), for example, while the backing file handle of LUN A should be [null, null].

Next, at 805 the VDisk module 61 causes the SCSI target layer 28 to pass the active file handle of LUN A to the file system layer 21 with an indication of the Restore request. The file system layer 21 responds at 806 by destroying LUN A in the active file system 31. At 807 and 808, the file system layer 21 then creates new LUN (LUN B) in the active file system as a clone of LUN C. This involves first creating a new empty LUN (LUN B) at 807, and then at 808, modifying the VTOC entry for LUN B so that the backing file handle of LUN B points to LUN C.

The VDisk module 61 then modifies the VTOC entry for LUN A (which no longer exists) at 809 so that any read or write request directed to LUN A will be serviced from LUN B. Assume for example that the PPI (LUN C) and has a PPI ID=3. In that case, the VTOC entry for LUN A will be changed so that its active file handle appears as [B,0] and its backing file handle appears as [C,3].

Next, at 810 the VDisk module 61 causes the file system layer 21 to set the clone flag in the inode of LUN B to indicate that LUN B is a clone. As described below, the clone flag is used in the event the storage server 2 receives a read request directed to LUN A during the restore process. Next, at 811 the VDisk module 61 signals the SCSI target layer 28 to modify the active file handle of LUN A as described above in the cached VTOC, and to resume servicing I/Os directed to LUN A. At this point, therefore, any I/Os that were buffered by the SCSI target layer 28 during this process and any subsequently received I/Os can be serviced by the file system layer 21, as described further below. In an alternative embodiment, any I/Os buffered between 803 and 811 will result in an error message being sent to the client, where the client retries the request after I/O has been resumed at 810.

The entire process up to this point takes very little time from the perspective of a human user or a client software application. Thus, from the perspective of a human user or client application client, normal I/O can proceed almost immediately after a restore is initiated.

Figure 9:
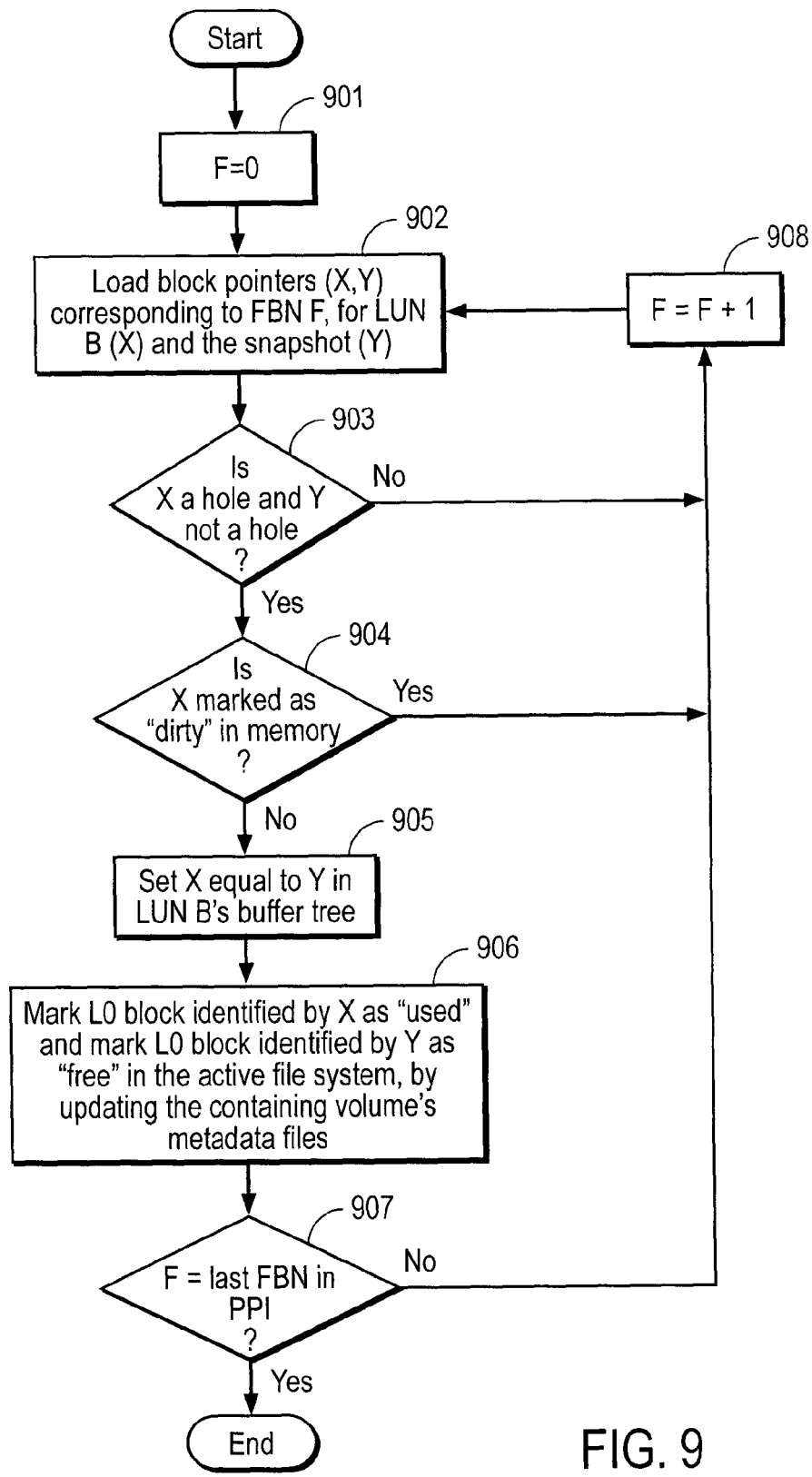
FIG. 9 is a flow diagram illustrating an example of a process of splitting the clone from the PPI.
Figure 10:
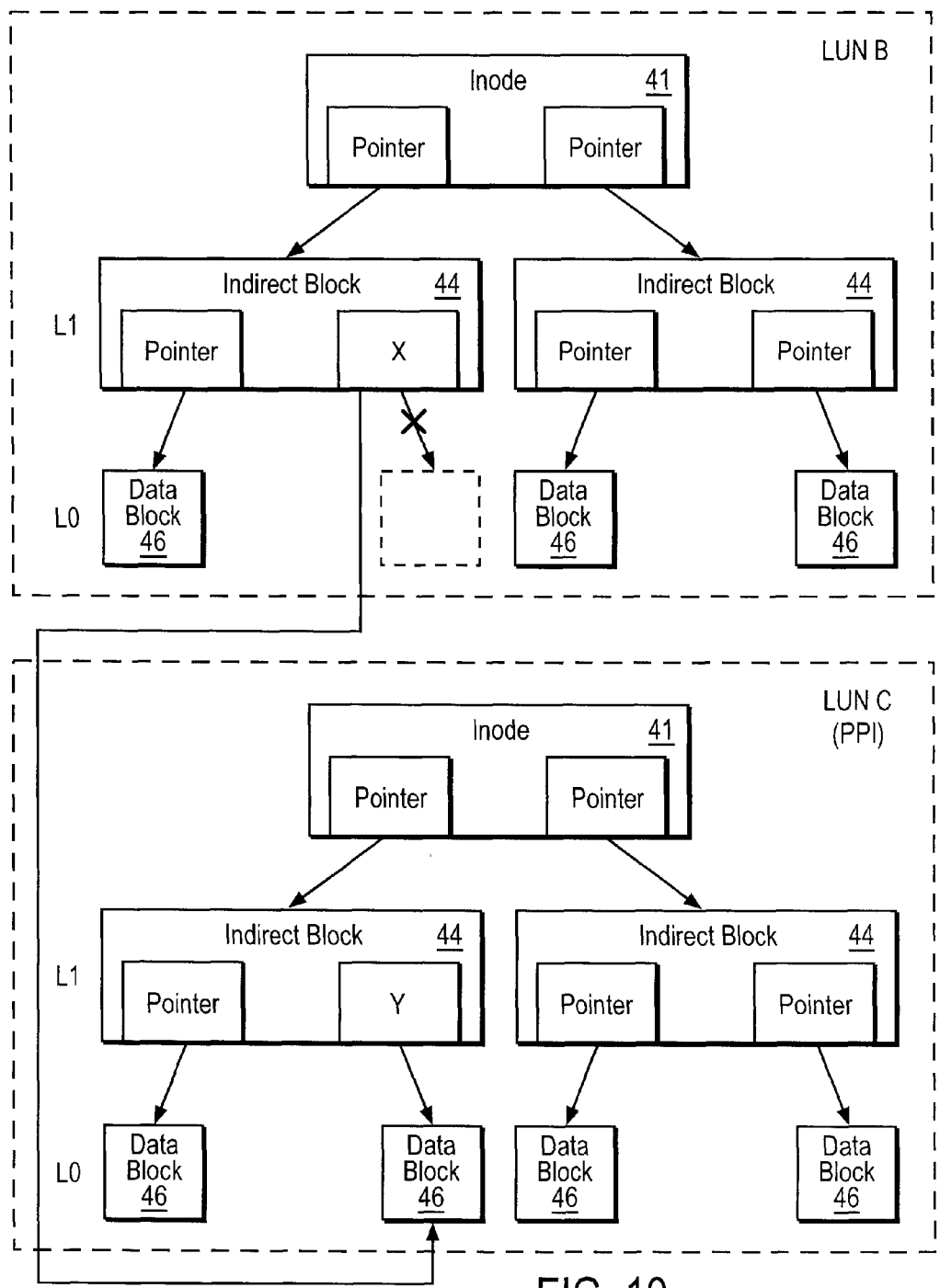
FIG. 10 shows a PPI and a clone of the PPI, where an L0 block pointer of the clone is set to point to an L0 block in the PPI.

The second phase of the restore process is splitting the clone from the PPI, which begins immediately upon completion of the first phase. The second phase will now be further described with reference to FIGS. 9 and 10. An index variable F is used in this process to refer to FBNs of direct (L0) blocks. As indicated above, an FBN identifies the logical (sequential) position of a direct (L0) block within a file. Initially, at 901 the index F is set equal to 0. At 902, the file system layer 21 loads the direct block (L0) pointers for FBN F, from both LUN B and the PPI (LUN C). As indicated above, these pointers point to actual data blocks (L0 blocks) and are found in a corresponding indirect (L1) block in LUN B and in the PPI. This pair of corresponding L0 block pointers is referred to as pointer X (in LUN B) and pointer Y (in the PPI), as shown in FIG. 10.

At 903 the file system layer 21 determines whether pointer X is a hole and pointer Y is not a hole. In other words, it determines whether pointer Y points to a valid direct block while pointer X is null. If the outcome of this determination is negative, the process proceeds to 908, in which the variable F is incremented, and the process then loops back to 902. If the outcome of this determination is positive (i.e., pointer X is a hole and pointer Y is not a hole), then the process proceeds with 904.

At 904, the process determines whether the direct block identified by pointer X is marked as "dirty" in main memory of the storage server 2 (otherwise known as the "buffer cache" of the storage server 2). If that block is marked as "dirty" in main memory, this means that a client submitted a write directed to LUN A during the restore process (a block is marked as "dirty" pending write allocation, at which time it will be marked as "used" persistently in the active file system 31, as described below). In that case, the process bypasses this particular FBN and its L0 pointers and proceeds from 908 as described above, with the selection of the next FBN and its pair of corresponding pointers, X and Y. If the block is not marked as "dirty" in memory, the process proceeds from 905.

At 905 the file system layer 21 sets pointer X equal to pointer Y in LUN B's buffer tree. Next, at 906 the file system layer 21 marks the direct block identified by pointer X as "used" and the direct block identified by pointer Y as "free" in the active file system 31, by updating the containing volumes metadata files. If FBN F was the last FBN in the PPI (907) (i.e., there are no more blocks to process in the PPI), the process ends otherwise, the process continues from 908, as described above, with the selection of the next pair of corresponding pointers, X and Y.

It can be seen that at the end of this process, LUN B no longer has any dependency on the PPI. Thus, LUN B has been "split" from the PPI, which completes the restore process.

Figure 11:
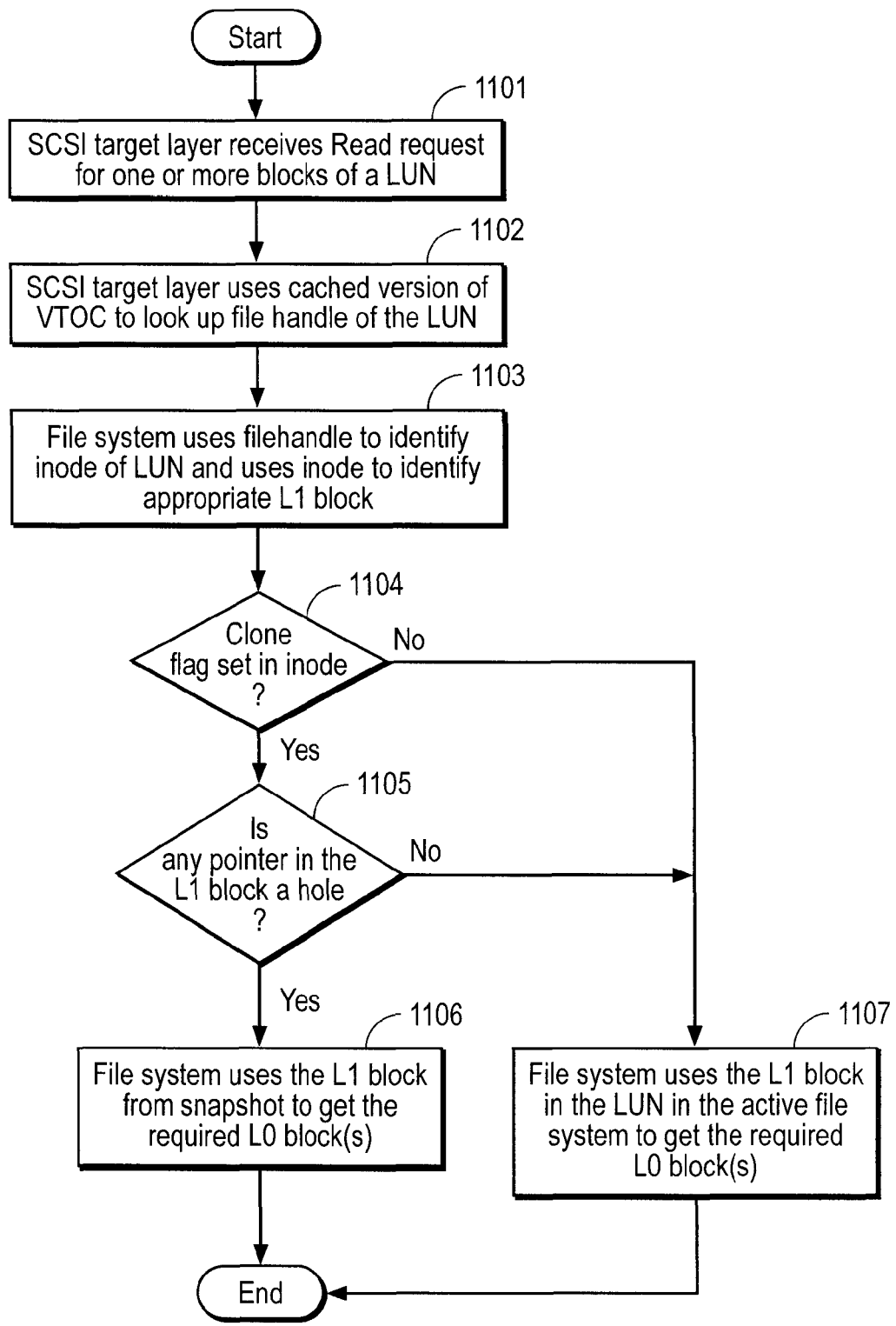
FIG. 11 is a flow diagram illustrating an example of a process of servicing a read request during a restore process.

As noted above, normal I/O directed to the LUN to be restored (LUN A) can be serviced as soon as the PPI clone (LUN B) has been created in the active file system 31 and the metadata has been updated. FIG. 11 illustrates the process of handling a read request that is received during the restore process, after I/O has been resumed. Initially, at 1101 the SCSI target layer 28 receives a read request for one or more blocks of a LUN. The read request includes a LUN identifier, an offset, and a size (indicating a range of blocks to read). At 1102 the SCSI target layer 28 uses its cached version of the VTOC 63 to look up the file handle of the LUN, based on the LUN identifier in the request. At 1103 the file system layer 21 uses the file handle to identify the inode of the identified LUN and uses the inode to identify the appropriate indirect (L1) block. The file system then determines at 1104 whether the clone flag is set in that inode.

If the clone flag is not set in the inode (i.e., the LUN is not a clone of a PPI), the normal read process is performed, i.e., the file system layer 21 uses the L1 block in the LUN in the active file system 31 to get the required direct (L0) blocks at 1107, which are then returned to the requesting client.

If, however, the clone flag is set, then the process proceeds to 1105, in which the file system layer 21 determines whether any pointer in the current indirect (L1) block is a hole. If any pointer in the indirect block is a hole, then at 1106 the file system layer 21 uses the indirect block from the PPI to get the required to direct (L0) blocks, which are then returned to the requesting client. Otherwise, i.e., if no pointer in the indirect block is a hole, then at 1107 the file system layer 21 uses the indirect block in the LUN in the active file system 31 to get the required direct blocks at 1107, which are then returned to the requesting client.

Figure 12:
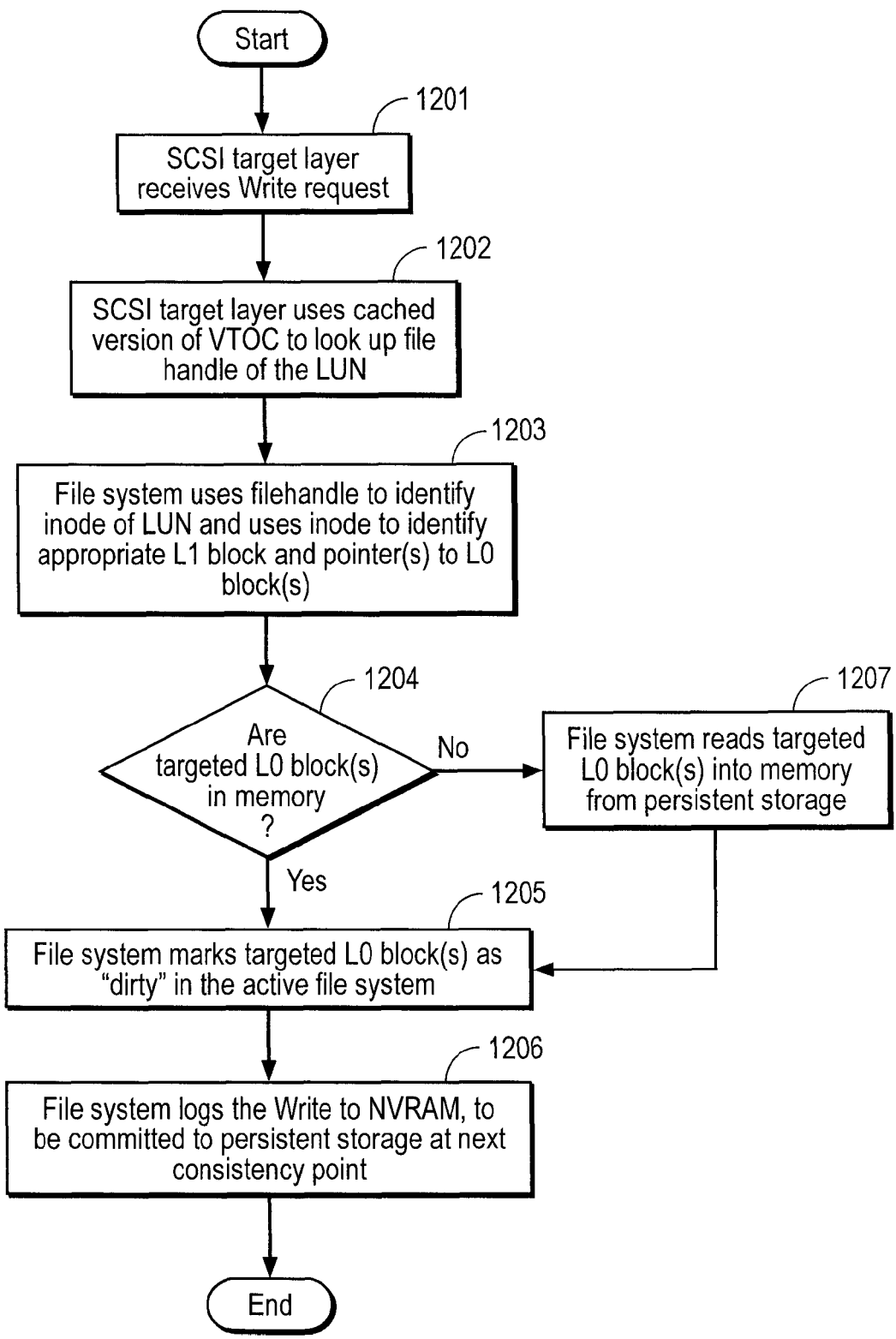
FIG. 12 is a flow diagram illustrating an example of a process of servicing a write request during a restore process.

FIG. 12 illustrates the process of handling a write request that is received during the restore process, after I/O has been resumed. Initially, at 1201 the SCSI target layer 28 receives a write request directed to one or more blocks of a LUN. At 1202 the SCSI target layer 28 uses its cached version of the VTOC 63 to look up the file handle of the LUN, based on the LUN identifier in the request. At 1203 the file system layer 21 uses the file handle to identify the inode of the LUN and uses the inode to identify the appropriate indirect (L1) block. The file system layer 21 then determines at 1204 whether the targeted direct (L0) blocks are in main memory (buffer cached). If the targeted blocks are not in main memory, the blocks are read into main memory from persistent storage at 1207. When the blocks are in main memory, at 1205 the file system layer 21 marks the targeted blocks as "dirty" (modified) in the active file system 31. The file system layer 21 then logs the write to a non-volatile memory random access memory (NVRAM), where all writes are temporarily stored until they can be committed to persistent storage (i.e., the next "consistency point"). Accumulated writes may be committed from NVRAM to persistent storage periodically, at predetermined times, or according to a predetermined schedule.

Figure 13:
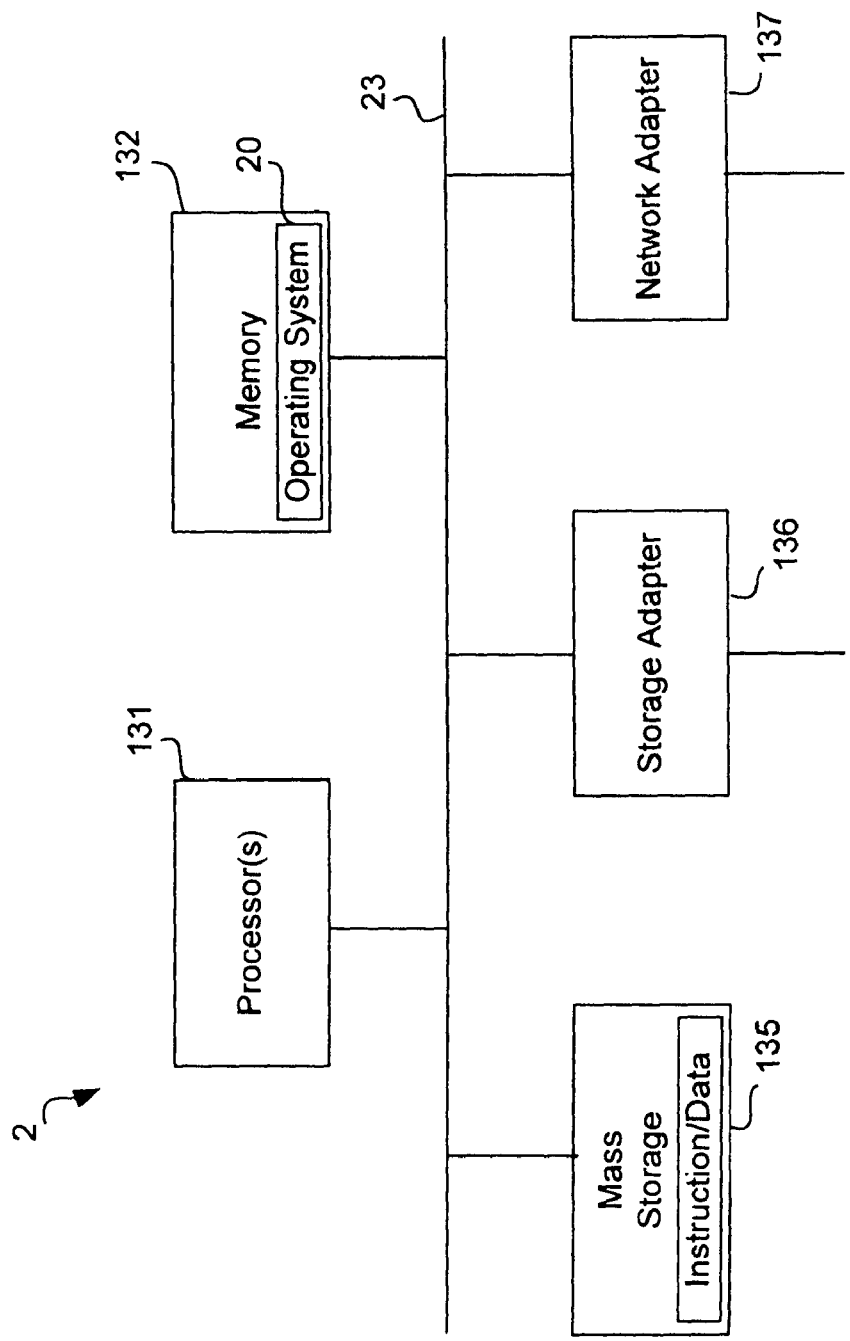
FIG. 13 is a high-level block diagram of the architecture of the storage server.

FIG. 13 is a block diagram showing an example of the architecture of the storage server 2, at a high level. Certain standard and well-known components which are not germane to the present invention are not shown. The storage server 2 includes one or more processors 131 and memory 132 coupled to a bus system 133. The bus system 133 shown in FIG. 13 is an abstraction that represents any one or more separate physical buses and/or point-to-point connections, connected by appropriate bridges, adapters and/or controllers. The bus system 133, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 131 are the central processing units (CPUs) of the storage server 2 and, thus, control its overall operation. In certain embodiments, the processors 131 accomplish this by executing software stored in memory 132. A processor 131 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 132 includes the main memory of the storage server 2. Memory 132 represents any form of random access memory (RAM), read-only memory (ROM), flash memory, or the like, or a combination of such devices. Memory 132 stores (among other things) the storage server's operating system 20, which can implement the technique introduced herein.

Also connected to the processors 131 through the bus system 133 are one or more internal mass storage devices 135, a storage adapter 136 and a network adapter 137. Internal mass storage devices 135 may be or include any conventional medium for storing large volumes of data in a non-volatile manner, such as one or more magnetic or optical based disks. The storage adapter 136 allows the storage server 2 to access the storage subsystem 4 and may be, for example, a Fibre Channel adapter or a SCSI adapter. The network adapter 137 provides the storage server 2 with the ability to communicate with remote devices, such as the clients 1, over a network and may be, for example, an Ethernet adapter, a Fibre Channel adapter, or the like.

Thus, a method and apparatus for restoring a data set from a PPI have been described.

A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

References throughout this specification to "one embodiment" or "an embodiment" mean that a particular feature, structure or characteristic described in connection with the embodiment is included in at least one embodiment of the present invention. Therefore, it is emphasized and should be appreciated that separate references in this specification to "an embodiment", "one embodiment" or "an alternative embodiment" are not necessarily all referring to the same embodiment. However, such references also are not necessarily mutually exclusive. Hence, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a storage server, the method comprising:

executing, by the storage server, a process of restoring a data set in an active file system of the storage server from a persistent point-in-time image (PPI) by updating a plurality of pointers in the active file system to reference data blocks of the PPI, wherein the updating comprises modifying at least one of the plurality of pointers to associate a block of the PPI with the data set; and during said process of restoring the data set from the PPI, servicing a request for a data block, wherein the request is directed at the data set by a client of the storage server by, in response to determining that a pointer corresponding to the requested data block points to a block in the data set that does not contain valid data, sending the requested data block to the client before said process of restoring is completed, wherein the requested data block is retrieved from the PPI.

2. A method as recited in claim 1, wherein said servicing an I/O request directed at the data set comprises:

servicing an I/O request directed at the data set so that the process of restoring the data set from the PPI is transparent to an entity or entities that initiated the I/O requests.

3. A method of restoring data from a persistent point-in-time image (PPI) in a storage server that has an active file system, the method comprising:

receiving a request to restore from the PPI a first data set in the active file system;

restoring, by the storage server, the first data set in response to the request by:

destroying the first data set in the active file system;

creating in the active file system an empty second data set backed by the PPI, wherein metadata associated with the empty second data set includes a plurality of pointers;

splitting the second data set from the PPI by modifying at least one of the pointers to identify at least one data block belonging to the PPI as belonging to the second data set; and in response to determining that a pointer corresponding to the requested data block points to a block in the second data set that does not contain valid data, servicing a request from a client of the storage server for the requested data block from the first data set by retrieving the requested data block from the PPI and sending the requested data block to the client before the restoring is completed.

4. A method as recited in claim 3, further comprising, after said creating the second data set backed by the PPI:

modifying metadata in the active file system so that a request for data in the first data set is serviced from the second data set.

5. A method as recited in claim 3, wherein the second data set includes a plurality of pointers for locating data blocks of the second data set and the PPI includes a plurality of pointers for locating data blocks of the PPI, and wherein said splitting the second data set from the PPI comprises:

for each pointer in the second data set which is null and for which a corresponding pointer in the PPI is not null, setting the value of the pointer in the PPI to the pointer in the second data set.

6. A method as recited in claim 5, wherein said splitting the second data set from the PPI further comprises, for each pointer in the second data set which is null and for which the corresponding pointer in the PPI is not null:

updating file system metadata to indicate that the data block referenced by the pointer in the second data set is used by the active file system; and updating the file system metadata to indicate that the data block referenced by the corresponding pointer in the PPI is free.

7. A method as recited in claim 3, further comprising:

receiving from a client an I/O request directed at the first data set; and if the I/O request is received after the first data set has been destroyed but before completion of said creating the second data set backed by the PPI, then buffering the I/O request until completion of said creating the second data set backed by the PPI, and then after completion of said creating the second data set backed by the PPI, servicing the buffered I/O request by using the second data set.

8. A method as recited in claim 3, wherein the set of data is a logical unit number (LUN).

9. A method as recited in claim 3, further comprising:

after said creating the second data set backed by the PPI, modifying metadata in the active file system so that a request for data in the first data set is serviced from the second data set;

receiving from a client an I/O request directed at the first data set; and if the I/O request is received after the first data set has been destroyed but before completion of said creating the second data set backed by the PPI, then buffering the I/O request until completion of said creating the second data set backed by the PPI, and then after completion of said creating the second data set backed by the PPI, servicing the buffered I/O request from the second data set.

10. A method as recited in claim 9, wherein the second data set includes a plurality of pointers for locating data blocks of the second data set and the PPI includes a plurality of pointers for locating data blocks of the PPI, and wherein said splitting the second data set from the PPI comprises:

for each pointer in the second data set which is null and for which a corresponding pointer in the PPI is not null, setting the value of the pointer in the PPI to the pointer in the second data set;

for each pointer in the second data set which is null and for which the corresponding pointer in the PPI is not null, updating file system metadata to indicate that the data block referenced by the pointer in the second data set is used by the active file system; and updating the file system metadata to indicate that the data block referenced by the corresponding pointer in the PPI is free.

11. A storage server comprising:

a processor;

a first communication interface through which to communicate with an array of mass storage devices;

a second communication interface through which to communicate with a client of the storage server;

an active file system;

a memory storing instructions which configure the processor to restore, from a read-only persistent point-in-time image (PPI) of a data set, a first data set stored in the array of mass storage devices and represented in the active file system, by:

destroying the first data set in the active file system;

creating in the active file system an empty second data set backed by the PPI, wherein metadata associated with the empty second data set includes a plurality of pointers;

in the active file system, modifying a file handle of the first data set to point to the second data set;

splitting the second data set from the PPI by modifying at least one of the pointers to identify at least one data block belonging to the PPI as belonging to the second data set; and in response to determining that a pointer corresponding to the requested data block points to a block in the second data set that does not contain valid data, servicing a request from a client of the storage server for the requested data block from the first data set by retrieving the requested data block from the PPI and sending the requested data block to the client before the restoring is completed.

12. A storage server as recited in claim 11, wherein the second data set includes a plurality of pointers for locating data blocks of the second data set and the PPI includes a plurality of pointers for locating data blocks of the PPI, and wherein said splitting the second data set from the PPI comprises:

for each pointer in the second data set which is null and for which a corresponding pointer in the PPI is not null, setting the value of the pointer in the PPI to the pointer in the second data set.

13. A storage server as recited in claim 12, wherein said splitting the second data set from the PPI further comprises, for each pointer in the second data set which is null and for which the corresponding pointer in the PPI is not null:

updating file system metadata to indicate that the data block referenced by the pointer in the second data set is used by the active file system; and updating the file system metadata to indicate that the data block referenced by the corresponding pointer in the PPI is free.

14. A storage server as recited in claim 11, further comprising:

receiving from the client an I/O request directed at the first data set; and if the I/O request is received after the first data set has been destroyed but before completion of said creating the second data set backed by the PPI, then buffering the I/O request until completion of said creating the second data set backed by the PPI, and then after completion of said creating the second data set backed by the PPI, servicing the buffered I/O request from the second data set.

15. A storage server as recited in claim 11, wherein the set of data is a logical unit number (LUN).

16. A storage server as recited in claim 11, further comprising:

receiving from the client an I/O request directed at the first data set; and if the I/O request is received after the first data set has been destroyed but before completion of said creating the second data set backed by the PPI, then buffering the I/O request until completion of said creating the second data set backed by the PPI, and then after completion of said creating the second data set backed by the PPI, servicing the buffered I/O request from the second data set.

17. A storage server as recited in claim 16, wherein the second data set includes a plurality of pointers for locating data blocks of the second data set and the PPI includes a plurality of pointers for locating data blocks of the PPI, and wherein said splitting the second data set from the PPI comprises:

for each pointer in the second data set which is null and for which a corresponding pointer in the PPI is not null, setting the value of the pointer in the PPI to the pointer in the second data set;

for each pointer in the second data set which is null and for which the corresponding pointer in the PPI is not null, updating file system metadata to indicate that the data block referenced by the pointer in the second data set is used by the active file system; and updating the file system metadata to indicate that the data block referenced by the corresponding pointer in the PPI is free.

18. A method as recited in claim 1, wherein said servicing an I/O request directed at the data set comprises:

sending a data block from the PPI in response to receiving an I/O request for a data block from the data set.

* * * * *